United States Patent [19]

Rigny

[11] 4,212,716
[45] Jul. 15, 1980

[54] METHOD AND DEVICE FOR EXCITATION AND SELECTIVE DISSOCIATION BY ABSORPTION OF LASER LIGHT AND APPLICATION TO ISOTOPIC ENRICHMENT

[75] Inventor: Paul Rigny, Sceaux, France

[73] Assignee: Commissariat a l'Energie Atomique, Paris, France

[21] Appl. No.: 896,228

[22] Filed: Apr. 13, 1978

Related U.S. Application Data

[63] Continuation of Ser. No. 738,136, Nov. 2, 1976, Pat. No. 4,144,453.

[30] Foreign Application Priority Data

Nov. 2, 1976 [FR] France ................. 75 34503

[51] Int. Cl.$^2$ ............................................. H01J 27/00
[52] U.S. Cl. ............................. 204/157.1 R; 250/281; 250/288; 250/423 P
[58] Field of Search ................. 250/423 P, 281, 288

[56] References Cited

U.S. PATENT DOCUMENTS 3,937,956  2/1976  Lyon .................. 250/423 P

OTHER PUBLICATIONS

"Selective Two-Step Photoionization-by Laser Radiation", by Ambartzumian et al., Applied Optics, vol. 11, No. 2 Feb. 72, pp. 354–357.
"Laser Isotope Separation", by Gross, Optical Engineering, vol. 13, No. 6, Nov.–Dec. 1974, pp. 506–515.

Primary Examiner—Harold A. Dixon
Attorney, Agent, or Firm—Burgess, Ryan and Wayne

[57] ABSTRACT

In a method of excitation and selective dissociation by absorption of the monochromatic light emitted by a high-power laser, the laser light is sent at a frequency $\nu_1$ into an isotopic mixture of gaseous molecules in which a certain number of molecules exhibit transitions between two vibrational levels corresponding to a predetermined isotope and separated by an energy interval $\Delta E_1 = 2h\nu_1$. The molecules of a predetermined isotopic species are thus excited preferentially until subsequent dissociation into a number of constituents.

17 Claims, 4 Drawing Figures

METHOD AND DEVICE FOR EXCITATION AND SELECTIVE DISSOCIATION BY ABSORPTION OF LASER LIGHT AND APPLICATION TO ISOTOPIC ENRICHMENT

This is a continuation of application Ser. No. 738,136, filed Nov. 2, 1976 now U.S. Pat. No. 4,144,453.

The present invention relates to a method of excitation and of selective dissociation by absorption of the monochromatic light emitted by a high-power laser and to a device for carrying out said method which are applicable in particular to the isotopic enrichment of uranium.

The monochromaticity of the light emitted by a laser as well as the high intensity of laser radiations obtained, especially with high-power carbon dioxide lasers, are such that the selective absorption of light by elements in the gaseous state is a particularly advantageous phenomenon which has heretofore been adapted to the separation of isotopes. Thus it comes about as a result of the differences in mass between two isotopes that, when these isotopes are constituents of chemical substances, the levels of electronic or molecular excitation of these substances are slightly different. By adjusting the energy of the photons emitted by the laser so as to ensure that it corresponds to a transition between two energy levels associated with a substance which includes a given isotope, the molecules or the atoms containing said isotope are excited preferentially. The substances (atoms or molecules) which are thus excited preferentially and selectively are separated from the remainder of the gaseous mass by various means which make use of radiation pressure, mass spectrography, chemical reactions and so forth. It has thus been possible to carry out a large number of isotope separations on substances having an absorption spectrum such that the energy difference between two levels corresponds to the energy of the photons of the laser light.

It is readily apparent that, in order to ensure economic performance of isotope separation by laser action when utilizing the resonance absorption phenomenon described earlier, the laser employed must have good efficiency of conversion of electrical energy to light energy and its cost price must be of a low order. The $CO_2$ laser and especially the $CO_2$ laser with electronic excitation by transverse discharge (TEA laser) satisfies these two requirements.

Unfortunately, the substances exhibiting an absorption spectrum in which two levels are separated by the energy of a photon emitted by a laser of this type are relatively rare, especially in the case of gaseous compounds containing uranium.

Moreover, in the case of vapors of complex molecules containing uranium or a heavy atom, the absorption lines are usually wide and, even if for example a selective effect can take place in the vicinity of an energy differential corresponding to a photon-wavelength of ten microns, its selectivity is too low to ensure that the single-photon selective absorption process described above can be applied under good conditions.

The present invention makes it possible to overcome these disadvantages and insufficiencies by employing a two-photon excitation and dissociation process. In accordance with the invention, laser light is sent into an isotopic mixture of gas molecules at a frequency $\nu_1$; some of these molecules exhibit transitions between two energy levels corresponding to a predetermined isotope which is separated by the energy interval $\Delta E = 2\,h\nu_1$ (where h is the Planck constant) and, by so doing, the molecules of a predetermined isotopic species are thus preferentially dissociated into a number of constituents.

In this mode of utilization, the laser light at the frequency $\nu_1$ serves both to excite the two-photon transitions in the first vibration level or levels and to continue the excitation until dissociation of the molecule which includes the given isotope. In another mode of utilization, a first beam of laser light is employed at the frequency $\nu_1$ for exciting the first two-photon resonant transition or transitions; a second laser beam is then sent at the frequency $\nu_2$ in order to continue the excitation until dissociation of the molecule which includes the given isotope.

The method in accordance with the invention makes use of a so-called "two-photon" transition. In other words, the light-irradiation source of frequency is of sufficiently high intensity to ensure that transitions take place between energy levels of the molecular system which are separated by an interval $\Delta E = 2\,h\nu_1$. As will become apparent hereinafter, the probabilities of two-photon excitations vary as the square of the flux density of incident light and can have a higher probability than the single-photon transitions in respect of very high laser light powers such as those produced by carbon-dioxide power lasers. Moreover, it may be noted in this case that the excitation energies which can be attained are within the range of frequencies of 1800 cm$^{-1}$ to 2200 cm$^{-1}$, expressed in wave number (corresponding to wavelengths between 4.5 and 5.5 microns). This can offer advantages over single-photon transitions in the case of uranium, for example, when transitions of the molecular system about $h\nu_1$ do not exist.

In one of its alternative embodiments in which very high power $CO_2$ lasers are employed, the invention makes it possible to dissociate the molecules which undergo vibration under the action of photon excitation and vibrate more and more violently (the quantum numbers of the vibrational levels increase) until they dissociate. This process is selective: the molecules which include the isotope having vibrational energy levels corresponding to the energy $\Delta E = 2\,h\nu_1$ are dissociated preferentially to the others. Since the intervals between the different vibrational levels are not usually equal by reason of the anharmonicity of vibrations, these processes are possible only in the presence of light irradiation of extremely high intensity which permits compensation for inequalities of the intervals. In fact, narrowing of the energy differences between successive levels having high quantum numbers is apparently compensated by broadening of these levels due to the Stark effect for example, with the result that there always exists even in the vicinity of the dissociation a possible transition between levels in respect of a transition energy $\Delta E = 2\,h\nu_1$.

In one embodiment of the method according to the invention, the elements obtained by selective dissociation are eliminated or removed by causing them to react with a chemical species which is included in the mixture.

In the event that two levels having the same quantum number corresponding to two isotopic species are insufficiently separated as a result of broadening of the levels by Doppler effect, it is an advantage in accordance with the invention to employ a two-photon process in which the two photons arrive in the gas mixture in "top-to-tail" relation. As will be seen later, this eliminates the Doppler effect and makes it possible to achieve selective dissociation if the difference in levels between the two isotopic species is greater than the natural width of the two lines.

An alternative embodiment of the method according to the invention accordingly consists in separating the laser beam into two parts and in sending these two parts into the gas mixture in substantially parallel and opposite directions of propagation.

Further properties and advantages of the invention will become more readily apparent from the following description of preferred embodiments which is given by way of explanation but not in any limiting sense, reference being made to the accompanying drawings, wherein.

Figure 1:
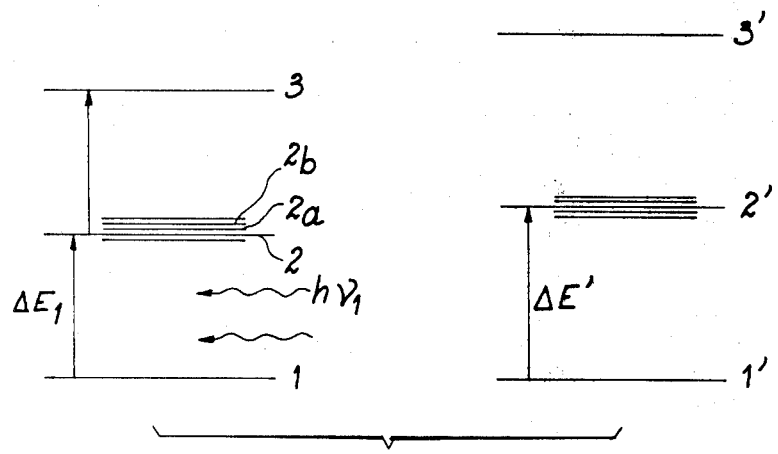
FIG. 1 shows two vibrational spectra corresponding to two isotopic species excited by photons whose energy is one-half the energy interval between two vibrational levels.

There is shown on the left-hand side of FIG. 1 a first series of vibrational levels designated as references by the quantum numbers 1, 2, 3 and 4 of said levels (in this description, the numeral 1 designates the ground-state level) corresponding to a given isotopic species. The right-hand side of the figure shows the vibration-rotation levels having the same quantum number followed by a prime index corresponding to another isotopic species of the same element; the difference $\Delta E'$ between these two vibrational levels is not the same as the difference $\Delta E_1$ in the case of the first isotopic species. The method according to the invention consists in sending two photons having a frequency $\nu_1$ with a combined energy $2h\nu_1$ (where h is the Planck constant) which excite the transition from level 1 to level 2, from level 2 to level 3 and so forth until dissociation of the molecule occurs, the level $\Delta E_1$ being equal to twice the energy $h\nu_1$ of each photon. The rotational levels corresponding to each vibration are shown at $2a$, $2b$ and so on. The process of excitation and dissociation is selective if the difference $\Delta E_1 - \Delta E'$ is greater than the width of a vibration-rotation line.

Figure 2:
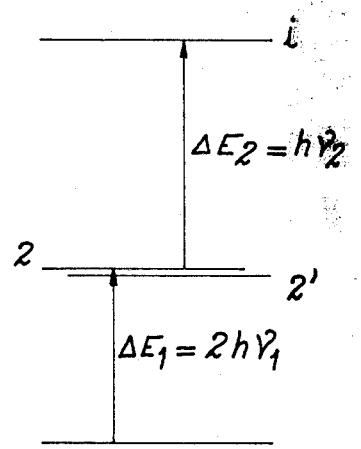
FIG. 2 is an illustration of an alternative embodiment of the method according to the invention comprising a non-selective irradiation step following the selective irradiation step.

FIG. 2 gives an explanatory diagram of an alternative mode of execution of the method according to the invention in which a level 2 is selectively excited by two photons having a frequency $\nu_1$ followed by a second irradiation having an energy $h\nu_2$ which causes the molecules or atoms of state 2 to pass to state 1 in which the molecule is dissociated. The irradiation having the energy $\Delta E_2$ is not selective but finally results in selective dissociation since only the level 2 is populated by the two-photon selective irradiation.

Figure 3:
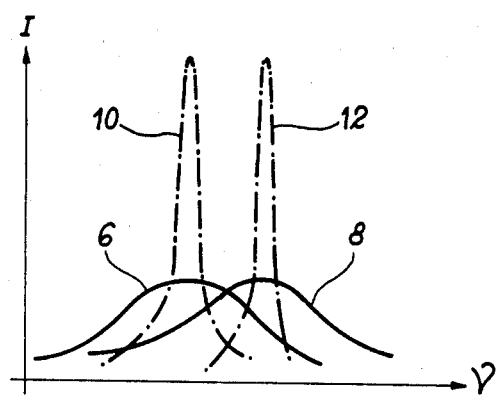
FIG. 3 shows the line spectra corresponding to two overlapping isotopic species.

FIG. 3 shows the profiles of the lines corresponding for example to two vibrational levels having the same quantum number of two isotopic species.

In FIG. 3, the frequency has been plotted as abscissae and the intensity I of the two lines corresponding for example to the levels 2 and 2' of FIG. 1 has been plotted as ordinates. The curves 6 and 8 correspond to the profiles of the two lines in respect of two isotopes of mass $m_1$ and $m_2$. It is apparent that these lines which are broadened by Doppler effect overlap to too great an extent to be readily separated by any two-photon process, having a selectivity which would be too low. On the other hand, the curves 10 and 12 represent the natural widths of these two lines in the absence of a Doppler effect. The influence of the Doppler effect can be eliminated by the action of two (top-to-tail) photons which travel towards each other. In this case, the two waves corresponding to the two groups of photons travel in opposite directions. In the case of a molecule having the velocity v, the two waves correspond to frequencies $\nu_1 \pm (k/2\pi)v$, where $+k$ corresponds to the wave number of the wave which travels in one direction and $-k$ corresponds to the wave which travels in the opposite direction. When the two photons are absorbed simultaneously, the resonance condition is written $(\nu_1 + (k/2\pi)v) + (\nu_1 - (k/2\pi)v) = 2\nu_1 = \Delta E_1/h$ and the Doppler effect has disappeared.

The utilization of this phenomenon makes it possible to separate the two lines which retain only their natural width, thus enhancing the selectivity of the method to a considerable extent. Thus in the case of isotopes having closely related masses at relative value (as in the case of uranium, for example), it will be an advantage to employ two separate beams having the same density and propagating towards each other, with the result that the excitation by two photons has high selectivity.

Thus the method according to the invention makes it possible to combine with high absorptions in the vicinity of 5 microns (laser wavelength) an effect of selectivity which is increased by two beams propagating in opposite directions.

Figure 4:
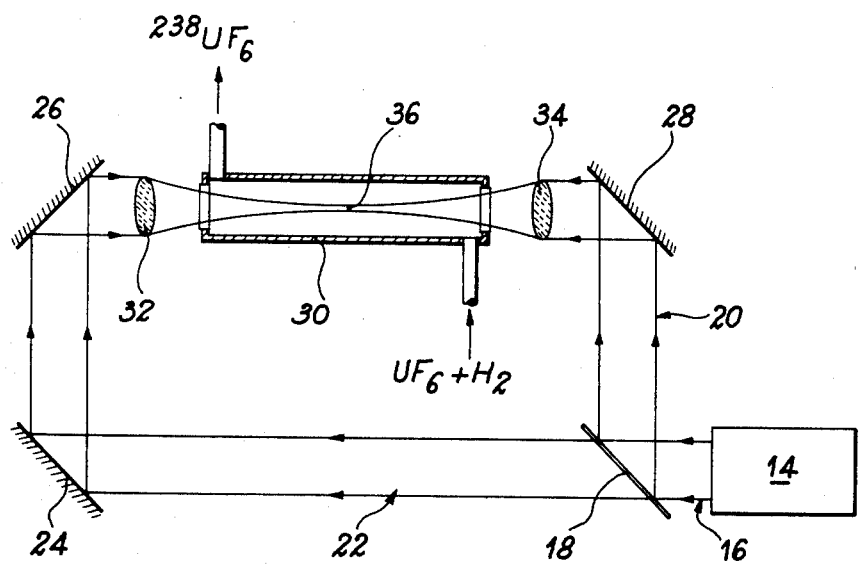
FIG. 4 is a diagram of a device for carrying out the method according to the invention.

FIG. 4 shows a device for carrying out the method according to the invention: by way of example, the laser 14 is a TEA laser which provides power output densities of the order of 1 GWatt/cm². The emergent laser beam 16 is separated by a semi-reflecting plate 18 of germanium for example into two beams 20 and 22 of substantially equal intensity. Said beams are reflected from the mirrors 24, 26 and 28 towards the enclosure 30 which is filled with the gaseous isotopic mixture such as a mixture of uranium hexafluoride and hydrogen, for example. The energy of the two beams is concentrated within the enclosure 30 by means of the lenses 32 and 34 of germanium, barium fluoride or sodium chloride, for example. The power level in the vicinity of the point of convergence 36 of the two lenses is sufficient to ensure that the two-photon excitation processes are appreciable.

In order to adapt the energy of a photon to one-half the energy corresponding to a vibrational transition, it will be possible to employ different isotopes of carbon and oxygen in the laser mixture.

Among the absorbent molecules in the vicinity of 5 microns, mention can be made of nitrosyl which absorbs in the NO absorption band in the vicinity of 1888 cm$^{-1}$, nydopenta-borane which absorbs at 1840 cm$^{-1}$, carbon monoxide which absorbs in the vicinity of 2140 cm$^{-1}$ whose energy is double the value corresponding to the line P(18) of a $C^{18}O_2$ laser (1070.60 cm$^{-1}$).

In the different examples given below, the molecules which absorb at double the frequency of the $CO_2$ laser are dissociated then separated chemically:

EXAMPLE 1

Irradiation of nitrosyl: the nitrosyl irradiated by photons derived from a $CO_2$ laser gives rise to the following reactions:

$$NO \rightarrow N + O$$

$$O + H_2 \rightarrow H_2O$$

$$N + 3/2\ H_2 \rightarrow NH_3$$

The products $H_2O$ and $NH_3$ are enriched in the isotope $O^{17}$, $O^{18}$ or $N^{15}$ corresponding to the selected line in the NO absorption band located in the vicinity of 1888 cm$^{-1}$. The difference between the lines is sufficient to obtain acceptable selectivity and it is not necessary to employ two beams which propagate in opposite directions.

EXAMPLE 2

The isotopes $B^{11}$ and $B^{10}$ of boron can be dissociated by irradiation of nydopentaborane, the boron of the selective isotopic species being trapped by action of bromine in accordance with the reactions:

$$B_5H_9 \rightarrow 5\ B + 9\ H$$

$$B + 3/2\ Br_2 \rightarrow B\ Br_3$$

it being possible to utilize the vibrational frequency of pentaborane of 1840 cm$^{-1}$ at the time of a process involving two photons derived from a $CO_2$ laser.

EXAMPLE 3

The isotopes of carbon and of oxygen can be separated by irradiation of a mixture of carbon monoxide and chlorine at a frequency in the vicinity of 2140 cm$^{-1}$. In this case, the product of the reaction, namely phosdene $COCL_2$ is enriched in the carbon isotope corresponding to the irradiated isotopic species.

In these first three examples, the vibrational levels are sufficiently distinct by virtue of the low mass of the isotopic compounds to avoid the need for irradiation of the "top-to-tail" type with two beams propagating in opposite directions.

EXAMPLE 4

The use of two photons which propagate in opposite directions makes it possible to apply the method according to the invention with highly enhanced selectivity to molecules which do not have well-defined absorption lines among the different isotopic species of interest. In the case of uranium hexafluoride $UF_6$, the levels $3\nu_3$ (1870 cm$^{-1}$) and $2\nu_1 + \nu_2$ (1862 cm$^{-1}$) can both be excited by two-photon transitions having a wavelength in the vicinity of 10.6 microns; the second level is accessible from the ground state by means of a two-photon electrical dipole transition. In this case the number of transitions per second W between two levels in respect of a light power density $\rho$ is equal to $W = \sigma_2\ \rho^2$, the power density being expressed in photons cm$^{-2}$sec$^{-1}$. The section $\sigma_2$ is of the order of $10^{-50}$ cm/sec and the effective cross-section of a transition to a photon is typically of the order of $10^{-20}$ cm$^2$. A light power density $\rho$ of the order of $1.35 \times 10^{28}$ photons cm$^{-2}$sec, namely approximately 250 megawatts cm$^{-2}$ in respect of the typical emission wavelength of a $CO_2$ laser, results in the fact that the two-photon excitation is in that case just as efficient as a one-photon excitation at the power threshold corresponding to dissociation of the molecule. This threshold value is of the order of a few tens of Mwatts per cm$^2$ and can be attained by means of two-photon transitions. The width of the line emitted by the laser must be at least of the order of the frequency difference between the vibration-rotation lines of the two isotopic species, namely of the order of 50 MHertz.

In order to carry out this separation, it is possible to employ the device shown in FIG. 4; the pressure within the enclosure 30 is sufficiently low, namely of the order of 1 torr in order to prevent de-activating and non-selective collisions. The mixture of uranium hexafluoride and of one molecule which is capable of reacting on the dissociation products such as hydrogen for example is introduced into the enclosure. The beam emitted by the laser 14 has a power density of 1 GWatt cm$^{-2}$. The laser emits pulses having a duration of 100 nanoseconds which give rise to this selective dissociation of uranium hexafluoride and to the following chemical reactions:

$$^{235}UF_6 \rightarrow\ ^{235}UF_4 + 2\ F$$

$$H_2 + 2F \rightarrow 2HF$$

The depleted uranium hexafluoride is then discharged: the repetition frequency of the irradiation pulses can attain several tens of Hertz, thus ensuring a suitable flow rate of uranium hexafluoride enriched in uranium-235.

I claim:

1. A method of excitation and of selective dissociation by absorption of the monochromatic light emitted by at least one high-power laser, wherein the excitation is effected by light sent from the laser at a frequency $\nu_1$ into an isotopic mixture of gas molecules in which a certain number of said molecules exhibit transitions between two vibrational levels corresponding to a predetermined isotope and separated by an energy interval $\Delta E_1 = 2h\nu_1$ and wherein the molecules of a predetermined isotopic species are thus preferentially excited.

2. A method according to claim 1 wherein the molecules of said isotopic species are dissociated into a number of constituents by one laser light at a frequency $\nu_1$.

3. A method according to claim 2, wherein the laser which sent the light at frequency $\nu_1$ until a subsequent dissociation of molecules, is said one high-power laser.

4. A method according to claim 2, wherein the laser which sent the light at frequency $\nu_1$ until a subsequent dissociation of molecules is another laser than said high-power laser.

5. A method of excitation and of selective dissociation by absorption of the monochromatic light emitted by at least one high-power laser, according to claim 1, wherein another light is sent into said mixture additionally and simultaneously at a frequency $\nu_2$ so that after said other light is sent into said mixture said molecules of a predetermined isotopic species are dissociated into a number of constituents.

6. A method according to claim 1 wherein there is added to the mixture a gas which reacts with the constituents derived from the dissociated molecules of a predetermined isotopic species.

7. A method according to claim 1, directed to the enrichment of uranium and wherein the isotopic mixture comprises molecules A containing uranium and molecules B which react with the products of dissociation of the molecules A.

8. A method according to claim 7 wherein the molecules A are molecules of an isotopic mixture of uranium hexafluoride.

9. A method according to claim 8, wherein the molecules B are hydrogen molecules.

10. A method according to claim 1 wherein the laser which sends the light at the frequency $\nu_1$ is a carbon-dioxide laser.

11. A method according to claim 1 wherein the light emitted at the frequency $\nu_1$ by the laser is sent into the isotopic mixture in two substantially parallel and opposite directions of propagation.

12. A method according to claim 11, wherein said laser is sent into the isotopic mixture by separating the beam emitted by the laser into two beams by means of a semi-transparent plate, reflecting said two beam from mirror means to direct said beams in opposite directions of propagation into an enclosure containing the isotopic mixture, and concentrating the light of the two beams within the interior of said enclosure.

13. A method of excitation and of selective dissociation by absorption of the monochromatic light emitted by at least one high-power laser, wherein the excitation is effected by light sent from the laser at a frequency $\nu_1$ in the range of 900 cm$^{-1}$ to 1100 cm$^{-1}$ expressed in wave number, into an isotopic mixture of gas molecules in which a certain number of said molecules exhibit transitions between two vibrational levels corresponding to a predetermined isotope and separated by an energy interval $\Delta E_1 = 2h\nu_1$ and wherein the molecules of a predetermined isotopic species of said mixture are thus preferentially excited.

14. A method of excitation and of selective dissociation by absorption of the monochromatic light emitted by at least one high-power laser, wherein the excitation is effected by light sent from the laser at a frequency $\nu_1$ in the range of 900 cm$^{-1}$ to 1100 cm$^{-1}$ expressed in wave number, into an isotopic mixture of gas molecules comprising a nitrosyl in which a certain number of said molecules exhibit transitions between two vibrational levels corresponding to a predetermined isotope and separated by an energy interval $\Delta E_1 = 1888$ cm$^{-1}$, expressed in wave number, and wherein the molecules of a predetermined isotopic species of said mixture are thus preferentially excited.

15. A method of excitation and of selective dissociation by absorption of the monochromatic light emitted by at least one high-power laser, wherein the excitation is effected by light sent from the laser at a frequency $\nu_1$ in the range of 900 cm$^{-1}$ to 1100 cm$^{-1}$ expressed in wave number, into an isotopic mixture of gas molecules comprising a nydopentaborane in which a certain number of said molecules exhibit transitions between two vibrational levels corresponding to a predetermined isotope and separated by an energy interval $\Delta E_1 = 1840$ cm$^{-1}$, expressed in wave number, and wherein the molecules of a predetermined isotopic species of said mixture are thus preferentially excited.

16. A method of excitation and of selective dissociation by absorption of the monochromatic light emitted by at least one high-power laser, wherein the excitation is effected by light sent from the laser at a frequency $\nu_1$ in the range of 900 cm$^{-1}$ to 1100 cm$^{-1}$ expressed in wave number, into an isotopic mixture of gas molecules comprising carbon and chlorine in which a certain number of said molecules exhibit transitions between two vibrational levels corresponding to a predetermined isotope and separated by an energy interval $\Delta E_1 = 2140$ cm$^{-1}$, epressed in wave number, and wherein the molecules of a predetermined isotopic species of said mixture are thus preferentially excited.

17. A method of excitation and of selective dissociation by absorption of the monochromatic light emitted by at least one high-power laser, wherein the excitation is effected by light sent from the laser at a frequency $\nu_1$ in the range of 900 cm$^{-1}$ to 1100 cm$^{-1}$, expressed in wave number, into an isotopic mixture of gas molecules comprising uranium hexafluoride, in which a certain number of said molecules exhibit transitions between two vibrational levels corresponding to a predetermined isotope and separated by energy interval $\Delta E_1 = 1870$ cm$^{-1}$, expressed in wave number, and wherein the molecules of a predetermined isotopic species of said mixture are thus preferentially excited.

* * * * *

UNITED STATES PATENT OFFICE
CERTIFICATE OF CORRECTION

Patent No. 4,212,716          Dated July 15, 1980

Inventor(s) Paul Rigny

It is certified that error appears in the above-identified patent and that said Letters Patent are hereby corrected as shown below:

The priority date has been set out incorrectly; the correct date is --Nov. 12, 1975--, not "Nov. 2, 1976".

Column 4, line 17: "$(v_1+(k/2\pi)v) + (v_1-(k/2\pi)v)$" should be --$(v_1+k/2\pi\ v) + (v_1-k/2\pi\ v)$--.

Column 5, line 1: "NO $\longrightarrow$ N+O" should be --NO $\longrightarrow$ $\underline{N}$+$\underline{O}$--.

line 3: "O+$H_2$ $\longrightarrow$ $H_2O$" should be --$\underline{O}$+$H_2$ $\longrightarrow$ $H_2O$--.

line 21: "$B_5H_9$ $\longrightarrow$ 5 B + 9 H" should be --$B_5H_9$ $\longrightarrow$ $\underline{5\ B}$ + $\underline{9\ H}$--.

line 23: "B +3/2$Br_2$ $\longrightarrow$ B $Br_3$" should be --$\underline{B}$ +3/2 $Br_2$ $\longrightarrow$ B $Br_3$--.

line 58: After "cross-section" insert -- $\sigma_1$ --.

Column 6, line 18: "$^{235}UF_6$ $\longrightarrow$ $^{235}UF_4$+2 F" should be --$^{235}UF_6$ $\longrightarrow$ $^{235}UF_4$ + $\underline{2\ F}$--.

line 20: $H_2$+2F $\longrightarrow$ 2HF" should be --$H_2$ + $\underline{2F}$ $\longrightarrow$ 2 HF--.

UNITED STATES PATENT OFFICE
CERTIFICATE OF CORRECTION

Patent No. 4,212,716    Dated    July 15, 1980

Inventor(s)    Paul Rigny

It is certified that error appears in the above-identified patent and that said Letters Patent are hereby corrected as shown below:

Column 7, line 13:  "beam" should be --beams --.

Signed and Sealed this

Tenth Day of February 1981

[SEAL]

Attest:

RENE D. TEGTMEYER

Attesting Officer    Acting Commissioner of Patents and Trademar